US010297016B2

United States Patent
Li et al.

(10) Patent No.: US 10,297,016 B2
(45) Date of Patent: May 21, 2019

(54) VIDEO BACKGROUND REMOVAL METHOD

(71) Applicant: Peking University Shenzhen Graduate School, Shenzhen, Guangdong Province (CN)

(72) Inventors: Ge Li, Shenzhen (CN); Xianghao Zang, Shenzhen (CN); Wenmin Wang, Shenzhen (CN); Ronggang Wang, Shenzhen (CN)

(73) Assignee: Peking University Shenzhen Graduate School (CN)

(*) Notice: Subject to any disclaimer, the term of this patent is extended or adjusted under 35 U.S.C. 154(b) by 0 days.

(21) Appl. No.: 16/089,493

(22) PCT Filed: Jan. 5, 2017

(86) PCT No.: PCT/CN2017/070219
§ 371 (c)(1),
(2) Date: Sep. 28, 2018

(87) PCT Pub. No.: WO2018/058854
PCT Pub. Date: Apr. 5, 2018

(65) Prior Publication Data
US 2019/0114753 A1   Apr. 18, 2019

(30) Foreign Application Priority Data
Sep. 30, 2016   (CN) .......................... 2016 1 0873997

(51) Int. Cl.
*G06T 5/50* (2006.01)
*G06T 7/11* (2017.01)
(Continued)

(52) U.S. Cl.
CPC .............. *G06T 5/50* (2013.01); *G06N 7/005* (2013.01); *G06T 7/11* (2017.01); *G06T 7/194* (2017.01);
(Continued)

(58) Field of Classification Search
CPC .. G06T 5/50; G06T 7/194; G06T 7/11; G06N 7/005
See application file for complete search history.

(56) References Cited

U.S. PATENT DOCUMENTS 8,264,542 B2 *   9/2012   Lee ...................... G06K 9/3233
348/153
8,599,255 B2 *  12/2013   Lin .......................... H04N 7/18
348/143

(Continued)

FOREIGN PATENT DOCUMENTS

CN    103077520 A    5/2013
CN    103530886      1/2014

OTHER PUBLICATIONS

Surendra, Jun. 30, 2011(Jun. 30, 2011),9(2), ISSN: 1672-2558, entire document (Zhang,Shunmiao et al. A Motion Detection Algorithm based on Surendra Background Updating and Background Subtraction. Journal of Nanjing Institute of Technology (Natural Science Edition)).

(Continued)

Primary Examiner — Mekonen T Bekele
(74) Attorney, Agent, or Firm — The Belles Group, P.C.

(57) ABSTRACT

Disclosed is a video background removal method, which relates to the technical field of video analysis, and in particular to a background removal method based on an image block, a Gaussian mixture model and a random process. Firstly, the concept of blocks is defined, and a foreground and a background are determined by means of comparing a difference between blocks; a threshold value is automatically adjusted by using a Gaussian mixture model, and at the same time, the background is updated by using the idea of random process; and finally, an experiment is made on a BMC dataset, and a result shows that this method surpasses most of the current advanced algorithms, and the (Continued)

accuracy is very high. This method has wide applicability, can be applied to monitor video background subtraction, and is applied very importantly in the field of video analysis.

8 Claims, 1 Drawing Sheet

(51) Int. Cl.
*G06T 7/194* (2017.01)
*G06N 7/00* (2006.01)

(52) U.S. Cl.
CPC .............. *G06T 2207/10016* (2013.01); *G06T 2207/20021* (2013.01); *G06T 2207/20224* (2013.01)

(56) References Cited

U.S. PATENT DOCUMENTS

| | | | | |
|---|---|---|---|---|
| 9,449,230 | B2* | 9/2016 | Han | G06K 9/00355 |
| 2003/0194131 | A1* | 10/2003 | Zhao | G06K 9/46 |
| | | | | 382/190 |
| 2005/0104964 | A1* | 5/2005 | Bovyrin | G06K 9/38 |
| | | | | 348/155 |
| 2012/0051631 | A1 | 3/2012 | Nguyen et al. | |
| 2018/0365845 | A1* | 12/2018 | Zhang | G06T 7/254 |

OTHER PUBLICATIONS

International Search Report and Written Opinion for corresponding Application No. PCT/CN2017/070219, dated Jun. 28, 2017. WO.

* cited by examiner

VIDEO BACKGROUND REMOVAL METHOD

CROSS-REFERENCE TO RELATED PATENT APPLICATIONS

The present application is a U.S. national stage application under 35 U.S.C. § 371 of PCT Application No. PCT/CN2017/070219, filed Jan. 5, 2017, which claims priority to Chinese Patent Application No. 2016108739970, filed Sep. 30, 2016. The disclosures of the aforementioned priority applications are incorporated herein by reference in their entireties.

TECHNICAL FIELD

The present invention relates to the technical field of video analysis and more particularly to a background subtraction method based on image blocks, a Gaussian mixture model and a random process.

BACKGROUND ART

Background subtraction of a video means separating foreground and background objects in the video from each other. At present, there are two main types of videos, i.e., videos with the static image background, and videos with continuous background changes. Videos with the static image background mainly include videos recorded with a fixed camera, such as surveillance videos and the like. Videos with continuous background changes mainly include TV programs, Digital Video Recorder (DVR) videos and the like. The present invention is mainly directed against those videos of the first type, i.e., videos with the static image background. The most extensive application of such videos is surveillance videos that are widespread around streets and alleyways, elevators and crossroads. Due to being recorded for 24 hours, they may have an extremely large data size, but there may be only very little useful information therein. Therefore, video background subtraction has always been a very critical step in the field of video analysis.

The following are several main methods in the prior art.
I. Method based on the frame difference method. This method is the simplest one, in which the presence of a foreground object is determined by comparing a previous frame and a next frame to identify a difference therebetween. Thus, the biggest problem of the frame difference method is distinction between a background updating approach and the difference between the previous frame and the next frame. There is rarely an algorithm that can achieve an excellent effect only by using the frame difference method.
II. Method based on a Gaussian mixture model. This method, proposed in the 1990s, involves modeling each pixel point by means of a Gaussian mixture model, updating models online by using the expectation maximization algorithm, and finally, comparing the current pixel with the models to identify differences therebetween so as to determine whether the pixel is a foreground. The method has the disadvantage of heavy calculation burden due to respective modeling of three channels of each pixel and thus can hardly adapt to increasing image size at present.
III. Method based on a random process. In the early 21st century, a scholar proposed a method based on random sampling. Specifically, pixels in each frame are randomly sampled as the background and the background is updated randomly. Such an algorithm can produce a good effect by means of the idea of random process, but can still be improved.

SUMMARY OF THE INVENTION

To resolve the problems in the prior art, the present invention provides a novel video background subtraction method to achieve video background subtraction based on image blocks, a Gaussian mixture model and a random process. The method in the present invention can be applied to preprocessing of videos with the static image background to thereby obtain a foreground image, thus facilitating subsequent video analysis.

The principle of the present invention is as follows: the idea of the frame difference method, a Gaussian mixture model and a random process are fused in the method in the present invention, and following the idea of the traditional frame difference method, a foreground and a background can be obtained by means of differences between frames. This method differs from the prior methods in that the prior methods involve comparison between pixels in respect of a difference and the method in the present invention involves a pixel sum, i.e., a difference between image blocks. Each image block is modeled by using the Gaussian mixture model, and a threshold value is automatically generated. The background of an image is randomly updated following the idea of random process, so that small noise can be eliminated.

A frame difference method based on image blocks is mainly used in the present invention, and a Gaussian mixture model is used to automatically adjust the threshold value of the frame difference. In addition, the background is updated by the means of random process. The method in the present invention is tested on real videos of the Background Modeling Challenge (BMC) dataset and surpasses most of the current methods in effect.

The present invention provides the following technical solutions.

A video background subtraction method comprises: dividing an image into blocks of the same size, with a value of each block being the sum of pixel values in the block; building a Gaussian mixture model by means of a history of blocks in the video and automatically adjusting a threshold value with a standard deviation thereof; comparing blocks to identify a difference therebetween by means of the threshold value, thereby obtaining a foreground and a background; and randomly updating the background to eliminate a falsely detected foreground object. The method specifically comprises the following steps:
1) setting a block size to w*h, graying each frame having a size of W*H, and dividing the grayed image into m*n block; and defining the value of each block as the sum of pixels in the block;
2) regarding blocks in successive frames at the same position as a history of blocks $\{v_1, v_2, \ldots, v_n\}$, wherein all the following discussions are limited to blocks and history of blocks; modeling the history of blocks with a Gaussian mixture model, ranking all models in the mixture model by $\omega/\sigma$ of each model, taking triple standard deviation $3\sigma_1$ of the top-ranked model as the threshold value, and keeping constant updating of the threshold value;
3) updating the background, wherein the background can be updated by three approaches; firstly, the background is initialized with a first frame, wherein the background mentioned here and below refers to the value of one block; the first approach is to take a mean value of a previous block and a next block between which a difference value is smaller than the threshold value and of which a length is greater than l as the background, wherein l is a set value of the length of a sequence of successive blocks having similar values, and in the present invention, l is set to 5, representing the length of the blocks having similar values; the second approach is to take a mean value of successive blocks exceeding 20l as the background; and the third approach is to select a random block around the background, and when this block is a foreground and successively exceeds 4l, denote a mean value of successive foregrounds in the history of this block as the background; and 4) updating the foreground: firstly setting a potential foreground and then updating it to a final foreground.

The foreground can be updated by two approaches: the first approach is as follows: comparing adjacent previous and next blocks, and when a difference value therebetween is greater than the threshold value in step 2), setting the current block as the potential foreground, wherein the potential foreground herein means that it is not necessarily the foreground and needs to be further determined. The second approach is as follows: comparing the current block and the background, and when a difference value therebetween is greater than the threshold value, setting the current block as the potential foreground. Then, pixels in all processed blocks are averaged, and the obtained value is subtracted from pixels in the potential foreground block to obtain a difference value $\Psi$. Low-pass filtering (LPF) is performed on the difference value $\Psi$, and the potential foreground is determined as the foreground F when passable values are less than half of pixels, i.e., ½wh.

Compared with the prior art, the present invention has the following advantages:

The present invention provides a novel background subtraction method that allows free setting of a block size and has a distinct acceleration effect under the circumstance of a large video size. In addition, this method allows setting of different rectangles for objects of interest in different shapes and thus can better adapt to the objects of interest. According to the present invention, a threshold value can be automatically generated by using the Gaussian mixture model, so that the updated threshold value can better adapt to changes in the environment. Moreover, the idea of random process is adopted to update the background, so that the background can continuously erode foreground objects until the foreground objects disappear. As a result, the small noise foreground can be eliminated rapidly. The present invention can be applied to preprocessing of videos with the static image background to thereby obtain a foreground image, thus laying a good foundation for subsequent video analysis work.

Compared with the prior art, the present invention achieves the best effect that the current methods can achieve on the real data part of the BMC data set. The real data includes parking lots, highways, roads, railways, metros courtyards and the like, as well as weather such as day and night, rain, snow, gale and the like. This indicates that the present invention is suitable for use in a wide range of applications and has extremely high accuracy.

DETAILED DESCRIPTION OF THE INVENTION

The present invention will be further described by embodiments in conjunction with the drawings. However, the scope of the present invention may not be limited in any way.

The use of background subtraction is of great importance in the field of video analysis, especially in video surveillance. Compared with other video resources, surveillance videos have some unique characteristics, such as image stability, texture similarity and the like. On this basis, the present invention provides a novel background subtraction method. Firstly, the concept of blocks is defined, and an image is divided into blocks of the same size, with a value of each block being the sum of pixel values in the block. Blocks are compared to identify a difference therebetween so as to determine a foreground and a background. A Gaussian mixture model is employed to automatically adjust a threshold value, and meanwhile, the idea of random process is adopted to update the background. Finally, tests are run on the Background Models Challenge (BMC) dataset, and the results show that this method surpasses most of the current advanced algorithms.

The present invention provides a novel background subtraction method that allows free setting of a block size and has a distinct acceleration effect under the circumstance of a large video size. In addition, this method allows setting of different rectangles for objects of interest in different shapes and thus can better adapt to the objects of interest. According to the present invention, a threshold value can be automatically generated by using the Gaussian mixture model, so that the updated threshold value can better adapt to changes in the environment. Moreover, the idea of random process is adopted to update the background, so that the background can continuously erode foreground objects until the foreground objects disappear. As a result, small noise foregrounds can be eliminated rapidly.

Figure 1:
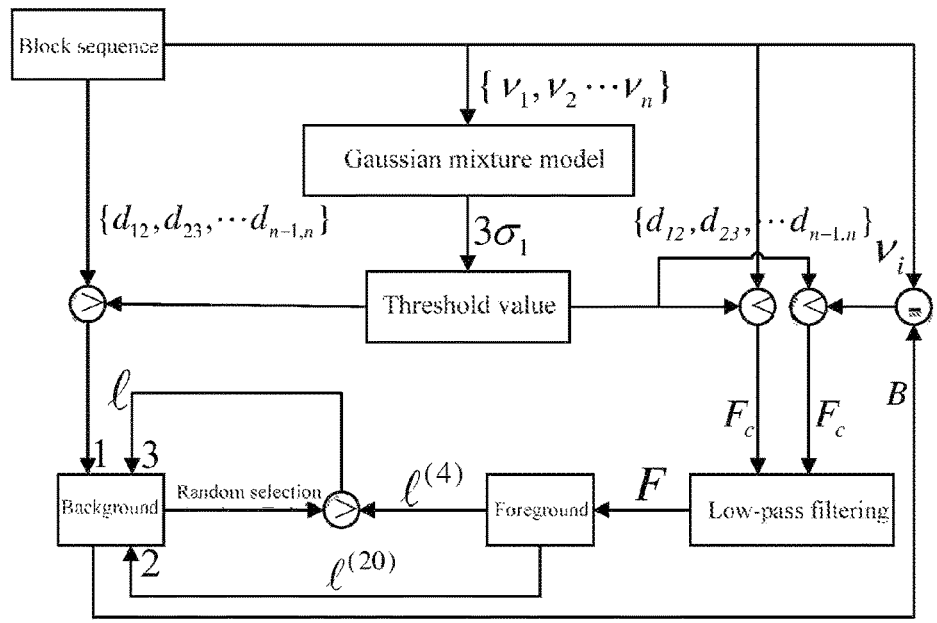
FIG. 1 is a flow block diagram of a video background subtraction method provided in the present invention, in which reference numerals indicate:
1—rapid background constructing with blocks, 2—background updating with a foreground, and 3—foreground updating with the background.

FIG. 1 is a flow block diagram of a video background subtraction method provided in the present invention. The video background subtraction method comprises: dividing an image into blocks of the same size, with a value of each block being the sum of pixel values in the block; building a Gaussian mixture model by means of a history of blocks in the video and automatically adjusting a threshold value with a standard deviation thereof; and comparing blocks to identify a difference therebetween by means of the threshold value, thereby obtaining a foreground and a background. In addition, backgrounds are randomly updated to eliminate falsely detected foreground objects.

The method specifically comprises the following steps:

First, each frame is converted into a gray image. Assuming that the size of each block size is w*h and the size of each frame is W*H, each frame is composed of m*n blocks, wherein m=W/w, and n=H/h. Each frame is represented by a matrix and each element of the matrix represents the value of one block. The value v of a block is defined as the sum of pixels $p_{i,j}$ in the block, expressed in equation 1:

$$v = \sum_{i=1}^{w}\sum_{j=1}^{h} p_{i,j}. \qquad \text{(equation 1)}$$

Second, a Gaussian mixture model was built. A mixture of K Gaussian models is set up by using a series of blocks $\{v_1, v_2, \ldots, v_n\}$. The K Gaussian models are weighted to obtain the Gaussian mixture model. The probability of the value of the current block represented by the Gaussian mixture model and denoted as P(vt), which is expressed in equation 2:

$$P(v_t) = \sum_{i=1}^{w} \frac{\omega_{i,t}}{(2\pi)^{\frac{1}{2}}\sigma_{i,t}} e^{-\frac{1}{2}(v_t-\mu_{i,t})T\sigma_{i,t}^{-1}(v_t-\mu_{i,t})} \quad \text{(equation 2)}$$

wherein $\omega_{i,t}$ represents an estimated weight of the ith Gaussian model at time t; $\mu_{i,t}$ is a mean value, i.e., the center of the model; and $\sigma_{i,t}$ is the standard deviation.

All models in the mixture model are ranked by $\omega/\sigma$. Each value $v_t$ is matched with the mixture model. Matching is to compare each value $v_t$ with the center of each model. The weight of a model will increase when the model is matched with more values. The more values a model is matched with, the smaller a variance thereof is, and the higher the ranking of the model is. The threshold is set to $3\sigma$ of a particular model in the mixture model to determine whether matching is successful. That is, when $|v_t-\mu_{i,t}|<3\sigma$, it indicates that $v_t$ is successfully matched with the model. If it fails in matching with all models, the last model is deleted, and a new model with $v_t$ as center is built and added to the end of the mixture model. When matching is successful, the following three parameters are updated: weight $\omega_{i,t-1}$, mean value $\mu$, and standard deviation $\sigma$.

The weight $\omega_{i,t-1}$ is updated by using the following equation (3):

$$\omega_{i,t}=(1-\alpha)\omega_{i,t-1}+\alpha V_{k,t} \quad \text{(equation 3)}$$

wherein $\alpha$ is a learning rate; when matching is successful, $V_{k,t}$ is 1; otherwise, $V_{k,t}$ is 0. The updated weights need to be re-regularized so as to ensure that the sum of all weights is 1.

For unmatched models, the parameters $\mu$ and $\sigma$ both remain unchanged. If a model is matched, the two parameters thereof need to be updated in the following way:

$$\mu_t=\mu_{t-1}+\rho_t(v_t-\mu_{t-1}) \quad \text{(equation 4)}$$

$$\sigma_t^2=(1-\rho_t)\sigma_{t-1}^2+\rho_t(v_t-\mu_{t-1})^T(v_t-\mu_{t-1}) \quad \text{(equation 5)}$$

wherein:

$$\rho_t=\alpha/\omega_{t-1} \quad \text{(equation 6)}.$$

Here, the approximate approach of equation 6 is adopted instead of $\rho_t=P(v_t)$, so that calculation can be simplified with similar performance.

The biggest advantage of this method is that the original Gaussian mixture model will not be breached and just be updated when something new emerges. In addition, the top model often has the highest weight and the lowest variance. Accordingly, triple standard deviation $(3\sigma_1)$ of the first Gaussian model is used as the threshold value, thus guaranteeing that our algorithm has high sensitivity to new things.

Third, backgrounds are updated. A background is initialized by using a first frame. The background mentioned here and the backgrounds discussed below all refer to the value of an image block. A background can be updated by the following three approaches.

31) A background is set up rapidly. If a successive subsequence (a successive block sequence) of which the length is greater than l and in which a difference value between a previous block and a next block is less than the threshold value is present in a block sequence, a mean value of such blocks is used to update the background, as shown in equation 7:

$$B = \frac{1}{l}\sum_{i=1}^{l} v_i(d_{i-1,i}<3\sigma_1) \quad \text{(equation 7)}$$

wherein $d_{i-1,i}=|v_i-v_{i-1}|$. After updating in this way, l is changed to 20 times l, i.e., $l^{(20)}=20l$. This means that more than 20l similar blocks need to be updated again. The intent is to keep a low updating rate after obtaining the backgrounds.

32) A background is updated with a foreground. The foreground $F_t$ here, just like the background, only refers to the value of a block. A mean value $\overline{F}$ of foregrounds is updated as shown in equation 8:

$$\overline{F}_t = \frac{\overline{F}_{t-1}+1+F_t}{l+1} \quad \text{(equation 8)}$$

wherein l is the length of successive foreground blocks. If there are more than $l^{(20)}$ successive foreground blocks, the mean value $\overline{F}$ of foregrounds is used to update backgrounds. In actual scenes, some objects may stop after moving, such as vehicles, animals, and people. Such stop objects will be processed as backgrounds in our algorithm.

33) A background is updated with a background. The idea of random process is adopted. Regarding each background block, one of adjacent blocks thereto is randomly selected, as shown in the figure. It is assumed that this adjacent block is a foreground block and its length exceeds $l^{(4)}$, wherein $l^{(4)}$ is 4 times l. Then, the background is updated with the mean value of foregrounds. This means that backgrounds can be updated faster. Some small noises can thus be gradually eaten up by backgrounds. Therefore, this method can remain large objects and give up small ones.

Fourth, foregrounds are updated. Following an idea similar to the frame difference method, in case of a difference between adjacent previous and next blocks $d_{i-1,i}>3\sigma_1$, the current block is regarded as the potential foreground $F_c$. In addition, if a difference between the current block and the background exceeds $3\sigma_1$, the current block is also regarded as the potential foreground $F_c$. Here, the potential foreground means that it may be not recognized as the foreground. The cause for this case is suddenly changing illumination, such as automobile lights turned on, and streetlights turned on. Accordingly, each pixel value in a block will increase and the value of the block may increase sharply. However, light is not a foreground object.

To solve this problem, calculations on pixel level are adopted. Regarding all calculated pixels, the pixels of their blocks are averaged, and then difference values $\Psi$ between pixels in the current block and such average pixels are obtained. The difference values are input into a low-pass filter. If less than half of pixels pass, the current block is regarded as the foreground.

$$F_c \text{ is} \begin{cases} \text{foreground} & |LPF(\psi)| < \frac{1}{2}wh \\ \text{background} & \text{others} \end{cases} \quad \text{(equation 9)}$$

Figure 2:
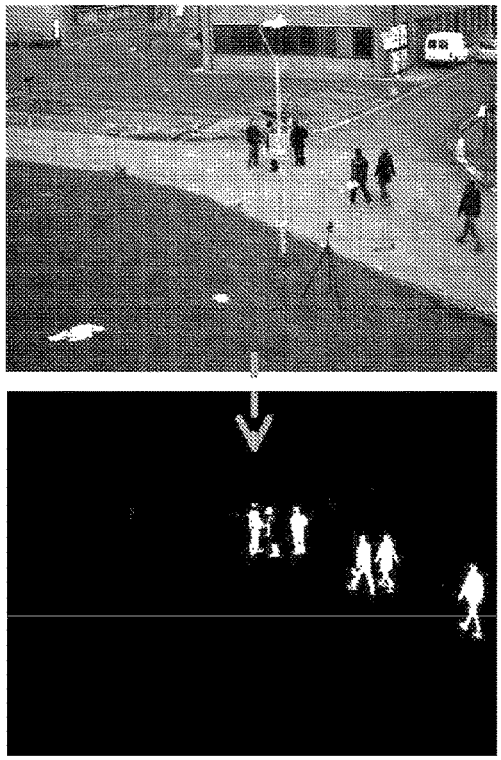
FIG. 2 is an example view after subtraction of the background from an original video in an embodiment of the present invention.

The sensitivity of the algorithm to illumination can be changed by adjusting the LPF. For example, even the shadows under the feet of a pedestrian can be filtered out by the LPF. FIG. 2 is an example view after subtraction of the background from an original video in an embodiment of the present invention, wherein the image above is an original video image, and the image below is a foreground image obtained after background subtraction by the method in the present invention.

TABLE 1

Test results of different methods on the BMC data set

|  | 1 | 2 | 3 | 4 | 5 | 6 | 7 | 8 | 9 | FSD |
|---|---|---|---|---|---|---|---|---|---|---|
| PBAS[1] | 0.8759 | 0.8762 | 0.9491 | 0.9357 | 0.8482 | 0.9160 | 0.8824 | 0.8204 | 0.8839 | 0.8676 |
| MultiLayer[2] | 0.8749 | 0.8849 | 0.9432 | 0.9324 | 0.8539 | 0.9228 | 0.8604 | 0.8233 | 0.8844 | 0.8701 |
| LBAthptiveSOM[3] | 0.8231 | 0.7142 | 0.9233 | 0.7971 | 0.7900 | 0.8547 | 0.8335 | 0.6924 | 0.8793 | 0.8306 |
| DPWrenGABGS[4] | 0.8583 | 0.8563 | 0.9306 | 0.9191 | 0.8540 | 0.8872 | 0.8762 | 0.7776 | 0.8670 | 0.8606 |
| MOGV1BGS[5] | 0.8662 | 0.8618 | 0.9070 | 0.8925 | 0.8640 | 0.8794 | 0.8318 | 0.8074 | 0.8668 | 0.8654 |
| FTSG[6] | 0.8932 | 0.9268 | 0.9034 | 0.9299 | 0.7673 | 0.9060 | 0.8560 | 0.7079 | 0.9205 | 0.8485 |
| our BoBS | 0.8685 | 0.8836 | 0.9508 | 0.9338 | 0.8671 | 0.9091 | 0.8545 | 0.7864 | 0.8806 | 0.8734 |

Finally, this method is tested on 9 real videos in the BMC data set. Table 1 shows the test results of the method in the present invention and six comparative advanced algorithms against the former on the BMC data set, wherein the leftmost cells display six methods mentioned in document [7] (Andrews Sobral and Antoine Vacavant, "A comprehensive review of background subtraction algorithms evaluated with synthetic and real videos," computer Vision and Image Understanding, vol. 122, pp. 4-21, 2014) (including five methods as Top 5 on the BMC dataset and one method as Top 1 on Change Detection Challenge 2014) and the method presented in the present invention; the cells of the top row display the serial numbers 1 to 9 of 9 real scene surveillance videos in the BMC data set and average FSD. Here, all scores are FSD scores. FSD represents an estimation method in background subtraction algorithms, and $\overline{FSD}$ represents a weighted average of FSD. The results indicate that the method in the present invention surpasses most of the optimal methods in effect. The five methods as Top 5 on the BMC dataset and the one method as Top 1 on Change Detection Challenge 2014 are set forth in the following corresponding documents, respectively:

[1] Martin Hofmann, Philipp Tiefenbacher, and Gerhard Rigoll, "Background segmentation with feedback: The pixel-based adaptive segmenter," in 2012 IEEE Computer Society Conference on Computer Vision and Pattern Recognition Workshops. IEEE, 2012, pp. 38-43.

[2] Jian Yao and Jean-Marc Odobez, "Multi-layer background subtraction based on color and texture," in 2007 IEEE Conference on Computer Vision and Pattern Recognition. IEEE, 2007, pp. 1-8.

[3] Lucia Maddalena and Alfredo Petrosino, "A self organizing approach to background subtraction for visual surveillance applications," IEEE Transactions on Image Processing, vol. 17, no. 7, pp. 1168-1177, 2008.

[4] Christopher Richard Wren, Ali Azarbayejani, Trevor Darrell, and Alex Paul Pentland, "Pfinder: Real-timetracking of the human body," IEEE Transactions on pattern analysis and machine intelligence, vol. 19, no. 7, pp. 780-785, 1997.

[5] Pakorn KaewTraKulPong and Richard Bowden, "An improved adaptive background mixture model for real-time tracking with shadow detection," in Video-based surveillance systems, pp. 135-144. Springer, 2002.

[6] Rui Wang, Filiz Bunyak, Guna Seetharaman, and Kannappan Palaniappan, "Static and moving object detection using flux tensor with split gaussian models," in Proceedings of the IEEE Conference on ComputerVision and Pattern Recognition Workshops, 2014, pp. 414-418.

It should be noted that the purpose of the disclosure of the embodiments is to help further understand the present invention, and those skilled in the art will appreciate that various alternatives and modifications may be made without departing from the spirit and scope of the present invention and the appended claims. Accordingly, the present invention should not be limited to the contents disclosed in the embodiments, and the scope of protection of the present invention is defined by the claims.

The invention claimed is:

1. A video background subtraction method, comprising: dividing an image into blocks of the same size, with a value of each block being the sum of pixel values in the block; building a Gaussian mixture model by means of a history of blocks in the video and automatically adjusting a threshold value with a standard deviation thereof; comparing blocks to identify a difference therebetween by means of the threshold value, thereby obtaining a foreground and a background; and randomly updating the backgrounds to eliminate falsely detected foreground objects;

the method specifically comprising the following steps:

1) setting a block size to w*h, graying each frame having a size of W*H, and dividing the grayed image into m*n block; and defining the value of each block as the sum of pixels in the block;

2) denoting blocks in successive frames at the same position as a history of blocks $\{v_1, v_2, \ldots, v_n\}$, modeling the history of blocks with a Gaussian mixture model, ranking all models in the mixture model, setting a threshold value and keeping constant updating of the threshold value by means of a standard deviation;

3) initializing a background by using the first frame and then updating the background, wherein the background refers to the value of one block; and approaches of updating the background include updating the background with a block sequence, updating the background with a foreground, and updating the background with a background; and 4) comparing adjacent blocks and comparing the current block and the background to identify respective differences therebetween to obtain a potential foreground, and obtaining a foreground based on the potential foreground.

2. The subtraction method of claim 1, wherein modeling the history of blocks with the Gaussian mixture model in step 2) specifically comprises setting up a mixture of K Gaussian models using a series of blocks $\{v_1, v_2, \ldots, v_n\}$ weighting the K Gaussian models to obtain the Gaussian mixture model, denoting the probability of the value of the current block by the Gaussian mixture model as P(vt), which is expressed in equation 2:

$$v = \sum_{i=1}^{w} \sum_{j=1}^{h} p_{i,j}$$ (equation 2)

wherein $\omega_{i,t}$ represents an estimated weight of the ith Gaussian model at time t; $\mu_{i,t}$ is a mean value, and $\sigma_{i,t}$ is the standard deviation.

3. The subtraction method of claim 2, wherein all models in the Gaussian mixture model are specifically ranked by $\omega/\sigma$ of each model, wherein $\omega$ is an estimated weight of each model and $\sigma$ is the standard deviation; and then triple standard deviation of the top-ranked model is set as the threshold value, thereby keeping constant updating of the threshold value.

4. The subtraction method of claim 1, wherein with regard to updating the background in step 3), the approach of updating the background with a block sequence specifically is to take a mean value of a previous block and a next block between which a difference value is smaller than the threshold value and of which a length is greater than l as the background; the approach of updating the background with a foreground specifically is to take a mean value of foregrounds successively exceeding 20l as the background; and the approach of updating the background with a background specifically is to select a random block around the background, and when this block is a foreground and successively exceeds 4l in the history of blocks, denote a mean value of foregrounds as the background, wherein l is a set value of the length of a sequence of successive blocks having similar values.

5. The subtraction method of claim 4, wherein the value of l is 5.

6. The subtraction method of claim 1, wherein a potential foreground is set in step 4) by one of the following two approaches:
a first approach, comparing adjacent previous and next blocks, and when a difference value between the adjacent previous and next blocks is greater than the threshold value, setting the current block as the potential foreground; a second approach, comparing the current block and the background, and when a difference value between the current block and the background is greater than the threshold value, setting the current block as the potential foreground.

7. The subtraction method of claim 1, wherein obtaining a foreground based on the potential foreground in step 4) specifically comprises: averaging pixels in all processed blocks, subtracting the obtained value from pixels in the potential foreground block to obtain a difference value $\Psi$, performing low-pass filtering on the difference value $\Psi$, and taking the potential foreground as the foreground when passable values are less than half of pixels.

8. The method subtraction method of claim 7, wherein the sensitivity of the subtraction method to illumination is changed by adjusting low-pass filtering.

* * * * *